United States Patent
Harada et al.

(10) Patent No.: US 10,562,107 B2
(45) Date of Patent: Feb. 18, 2020

(54) POWER TOOL

(75) Inventors: Tetsuhiro Harada, Hitachinaka (JP); Tomomasa Nishikawa, Hitachinaka (JP); Yoshihiro Nakano, Hitachinaka (JP); Hiroki Uchida, Hitachinaka (JP)

(73) Assignee: Koki Holdings Co., Ltd., Tokyo (JP)

(*) Notice: Subject to any disclaimer, the term of this patent is extended or adjusted under 35 U.S.C. 154(b) by 656 days.

(21) Appl. No.: 14/122,854

(22) PCT Filed: Aug. 13, 2012

(86) PCT No.: PCT/JP2012/005144
§ 371 (c)(1),
(2), (4) Date: Nov. 27, 2013

(87) PCT Pub. No.: WO2013/027372
PCT Pub. Date: Feb. 28, 2013

(65) Prior Publication Data
US 2014/0209338 A1 Jul. 31, 2014

(30) Foreign Application Priority Data
Aug. 19, 2011 (JP) .................. 2011-179826

(51) Int. Cl.
*B23F 5/00* (2006.01)
*B23B 45/00* (2006.01)
(Continued)

(52) U.S. Cl.
CPC ............ *B23B 45/001* (2013.01); *B25F 5/008* (2013.01); *B23Q 11/12* (2013.01)

(58) Field of Classification Search
CPC ......... B25F 5/008; H02K 7/145; B25Q 11/12; B25Q 11/126; B25Q 11/127
(Continued)

(56) References Cited

U.S. PATENT DOCUMENTS 3,546,502 A * 12/1970 Botefuhr ................. B25F 5/008
310/50
5,006,740 A * 4/1991 Palm .................... B23Q 11/005
310/43
(Continued)

FOREIGN PATENT DOCUMENTS

CN 101318319 12/2008
DE 19614580 A1 10/1996
(Continued)

OTHER PUBLICATIONS

International Search Report for application PCT/JP2012/005144(dated Sep. 24, 2012).
(Continued)

*Primary Examiner* — Chelsea E Stinson
(74) *Attorney, Agent, or Firm* — Kilpatrick Townsend & Stockton LLP (57) ABSTRACT

A power tool includes: a motor; a fan driven by the motor and defining an axis and a radial direction; and a housing for accommodating the motor and the fan therein, the housing including: a peripheral wall formed with a ventilation hole; and a grid partly covering the ventilation hole, the ventilation hole being positioned adjacent to the fan and having a shape defined by a circumferential surface, the grid including at least one elongated portion extending in a longitudinal direction perpendicular to the radial direction, and a distance from the axis of the fan to the circumferential surface is different from a distance from the axis of the fan to one elongated portion in the radial direction of the fan.

6 Claims, 5 Drawing Sheets

(51) Int. Cl.
*B25F 5/00* (2006.01)
*B23Q 11/12* (2006.01)

(58) Field of Classification Search
USPC .................... 173/109, 217, 201; 451/488
See application file for complete search history.

(56) References Cited

U.S. PATENT DOCUMENTS

| | | | | |
|---|---|---|---|---|
| 5,315,193 | A * | 5/1994 | Kummer | B23D 59/006 |
| | | | | 310/50 |
| 5,634,274 | A | 6/1997 | Ohkouchi et al. | |
| 6,536,536 | B1 * | 3/2003 | Gass | B23B 31/123 |
| | | | | 173/171 |
| 6,543,549 | B1 * | 4/2003 | Riedl | B25B 21/00 |
| | | | | 173/171 |
| 7,238,095 | B1 * | 7/2007 | Sun | B24B 23/026 |
| | | | | 173/104 |
| 7,832,499 | B2 | 11/2010 | Komuro et al. | |
| 8,084,901 | B2 * | 12/2011 | Oomori | B25F 5/008 |
| | | | | 310/50 |
| 8,123,596 | B2 | 2/2012 | Kobayashi et al. | |
| 8,205,684 | B2 * | 6/2012 | Kokinelis | B25F 5/008 |
| | | | | 173/162.2 |
| 8,398,465 | B2 * | 3/2013 | Hoeschele | B24B 23/028 |
| | | | | 451/359 |
| 9,138,884 | B2 * | 9/2015 | Heinzelmann | B23Q 11/14 |
| 2003/0163924 | A1 * | 9/2003 | Hempe | B23D 45/16 |
| | | | | 30/388 |
| 2004/0211578 | A1 * | 10/2004 | Hollis | H02K 5/148 |
| | | | | 173/217 |
| 2005/0252670 | A1 * | 11/2005 | Prell | B23D 51/16 |
| | | | | 173/39 |
| 2006/0000627 | A1 * | 1/2006 | Frauhammer | B25D 16/00 |
| | | | | 173/201 |
| 2008/0000665 | A1 * | 1/2008 | Kokinelis | B25F 5/008 |
| | | | | 173/170 |
| 2008/0090504 | A1 * | 4/2008 | Trautner | B24B 23/00 |
| | | | | 451/359 |
| 2008/0302551 | A1 * | 12/2008 | Komuro | B25F 5/008 |
| | | | | 173/217 |
| 2008/0305728 | A1 * | 12/2008 | Kobayashi | B25F 5/008 |
| | | | | 451/359 |
| 2009/0126964 | A1 * | 5/2009 | Schroeder | B25F 5/02 |
| | | | | 173/217 |
| 2009/0145621 | A1 * | 6/2009 | Lau | B25F 5/008 |
| | | | | 173/217 |
| 2009/0179507 | A1 * | 7/2009 | Tanimoto | H02K 7/145 |
| | | | | 310/50 |
| 2009/0322166 | A1 * | 12/2009 | Satterfield | B25F 5/02 |
| | | | | 310/50 |
| 2010/0132968 | A1 * | 6/2010 | Hartmann | B25F 5/008 |
| | | | | 173/109 |
| 2010/0218385 | A1 * | 9/2010 | Mang | B25F 5/008 |
| | | | | 30/216 |
| 2011/0006621 | A1 * | 1/2011 | Lau | B25F 5/008 |
| | | | | 310/50 |
| 2011/0162859 | A1 * | 7/2011 | White | E02D 7/125 |
| | | | | 173/1 |
| 2011/0227430 | A1 * | 9/2011 | Omori | B25F 5/00 |
| | | | | 310/50 |
| 2011/0253402 | A1 * | 10/2011 | Aradachi | H01M 2/1055 |
| | | | | 173/46 |
| 2012/0186844 | A1 * | 7/2012 | Maute | B24B 23/028 |
| | | | | 173/217 |
| 2012/0291294 | A1 * | 11/2012 | Middleton | B26B 7/00 |
| | | | | 30/277.4 |

FOREIGN PATENT DOCUMENTS

| | | |
|---|---|---|
| DE | 102005052426 A1 | 5/2007 |
| DE | 102008009277 A1 | 8/2009 |
| GB | 2383007 A | 6/2003 |
| JP | H3-20489 U * | 2/1991 |
| JP | H03-20489 U | 2/1991 |
| JP | H03-98740 A | 4/1991 |
| JP | H04-26593 U | 3/1992 |
| JP | H08-204372 A | 8/1996 |
| JP | H11-33934 A | 2/1999 |
| JP | 2008-302467 A | 12/2008 |
| JP | 2010-036260 A | 2/2010 |
| JP | 2010-105130 A | 5/2010 |
| JP | 2010-207992 A | 9/2010 |

OTHER PUBLICATIONS

International Report on Patentability for application PCT/JP2012/005144 (dated Mar. 6, 2014), 6 pages.
Japan Patent Office office action for patent application JP2011-179826 (dated Nov. 10, 2014).
China Intellectual Property Office office action for patent application CN201280040228.2 (dated Dec. 22, 2014).

* cited by examiner

FRONT ←——→ REAR

FIG.6

FRONT ←——→ REAR

FIG.7

POWER TOOL

TECHNICAL FIELD

The invention relates to a power tool, especially to a power tool having a motor as a power source.

BACKGROUND ART

Conventionally, a power tool having a motor as a power source is provided with a fan for cooling down the motor. A housing for accommodating the motor and the fan is formed with ventilation holes that serve as an intake port for introducing air into the housing and a discharge port for discharging air from the housing (for example, refer to Japanese Patent Application Publication No. 2010-105130).

DISCLOSURE OF INVENTION

Solution to Problem

For efficiency in performing introduction/exhaustion of air, one of the intake port and the discharge port may be formed at a position adjacent to the fan. However, positioning the ventilation hole close to the fan may allow foreign objects to enter inside the housing through the ventilation hole, thereby causing the fan to be locked or broken or causing the motor to be shorted out.

In view of the foregoing, it is an object of the invention to provide a power tool that can suppress foreign objects from entering into a housing through ventilation holes formed on the housing.

In order to attain the above and other objects, the invention provides a power tool including: a motor configured to drive an end bit; a fan configured to be driven by the motor and defining an axis and a radial direction; and a housing accommodating the motor and the fan therein. The housing includes: a peripheral wall having a ventilation hole formed therein; and a grid configured to partly cover the ventilation hole. The ventilation hole is positioned adjacent to the fan and has a shape defined by a circumferential surface whose length in the radial direction is coincident with a thickness of the peripheral wall. The grid includes at least one elongated portion extending in a longitudinal direction perpendicular to the radial direction. A distance from the axis of the fan to the circumferential surface is different from a distance from the axis of the fan to one elongated portion in the radial direction of the fan, if a plurality of elongated portions are provided, the one elongated portion being an elongated portion closest to the circumferential surface among the plurality of elongated portions, or if a single elongated portion is provided, the one elongated portion being the single elongated portion.

With this structure, entry of foreign objects into the housing through the ventilation hole (through gaps formed in the grid) can be suppressed effectively. Further, since the grid is formed such that the distance from the axis of the fan to the circumferential surface is different from the distance from the axis of the fan to one elongated portion in the radial direction of the fan, that is, since the elongated portions and the circumferential surface are arranged in a staggered manner, gaps are reliably formed in the grid to make sure that increase in resistance of air passage can be suppressed at the ventilation hole.

It is preferable that the grid includes a plurality of elongated portions, the elongated portions next to each other being disposed to be separated from the axis of the fan by distances different from each other in the radial direction of the fan.

It is preferable that the housing further comprises a rib portion that protrudes from an outer surface of the peripheral wall in the radial direction of the fan and that surrounds the ventilation hole.

It is preferable that the rib portion protrudes outward than the closest elongated portion in the radial direction of the fan.

With this structure, the rib portion can suppress entry of foreign objects into the ventilation hole can be suppressed. Further, the rib portion can serve as a bank that suppresses infiltration of water droplets adhered to an outer surface of the housing into the ventilation hole.

It is preferable that the grid includes a plurality of elongated portions and the peripheral wall defines an inner surface, one of the plurality of elongated portions other than the closest elongated portion being positioned to be aligned with the inner surface of the peripheral wall.

It is preferable that the grid includes a single elongated portion and the peripheral wall defines an outer surface, the single elongated portion being positioned outward than the outer surface of the peripheral wall in the radial direction of the fan.

With this structure, the inner surface of the housing can be formed as closely to the fan as possible so that the housing can be compact.

According to another aspect of the invention, there is provided a power tool including: a motor configured to drive an end bit; a fan configured to be driven by the motor; and a housing accommodating the motor and the fan therein. The housing includes a peripheral wall having a ventilation hole formed therein. The ventilation hole is positioned adjacent to the fan and is partly covered with a grid that prevents a pin having a diameter of 1.0 mm from entering into the housing through the ventilation hole.

With this structure, the grid covering the ventilation hole can prevent a bar-like shaped foreign object from entering into the housing through ventilation holes. A bar-like shaped foreign object having a diameter smaller than 1.0 mm tends to deform easily. Therefore, even if such foreign object penetrates into the housing through the ventilation hole, the fan can repel the object. However, a bar-shaped foreign object having a diameter equal to or larger than 1.0 mm could cause the fan to be locked when enters into the housing, leading to breakdown of the motor. The construction of the present invention can prevent such breakdown of the motor as a result of penetration of foreign objects through the ventilation hole.

Advantageous Effects of Invention

The power tool according to the present invention can effectively suppress foreign objects from entering inside the housing.

REFERENCE SIGNS LIST

1: impact driver
2: housing
2A: body portion
2B: handle
2c: cooling air passage
3: motor
4: gear mechanism
4A: frame body
4B: bearing
5: impact mechanism
21: intake port
21A: intake-side grid
22: discharge port
22A: discharge-side grid
23A, 23B, 23C: elongated portion
23D: connecting portion
23E: frame portion
24: terminal portion
25: light
26A: trigger
26B: switching portion
27: LED light
31: stator
32: rotor
32A: rotor shaft
32B: fan
32C: pinion gear
32D, 32E: bearing
33: motor driver circuit
41: spindle
41A: flange
41B: ball
41a: groove
42: ring gear
43: planetary gear
51: hammer case
51A: bearing
52: anvil
52A: end bit attachment portion
52C: ball
52D: operation portion
52E blade portion
52a: bore
52b: attachment hole
53: hammer
53A: pawl portion
53a: through-hole
53b: groove
53c: spring retaining portion
54A: first spring 100: control circuit portion
123: plate member
222A: discharge-side grid

BEST MODE FOR CARRYING OUT THE INVENTION

Figure 1:
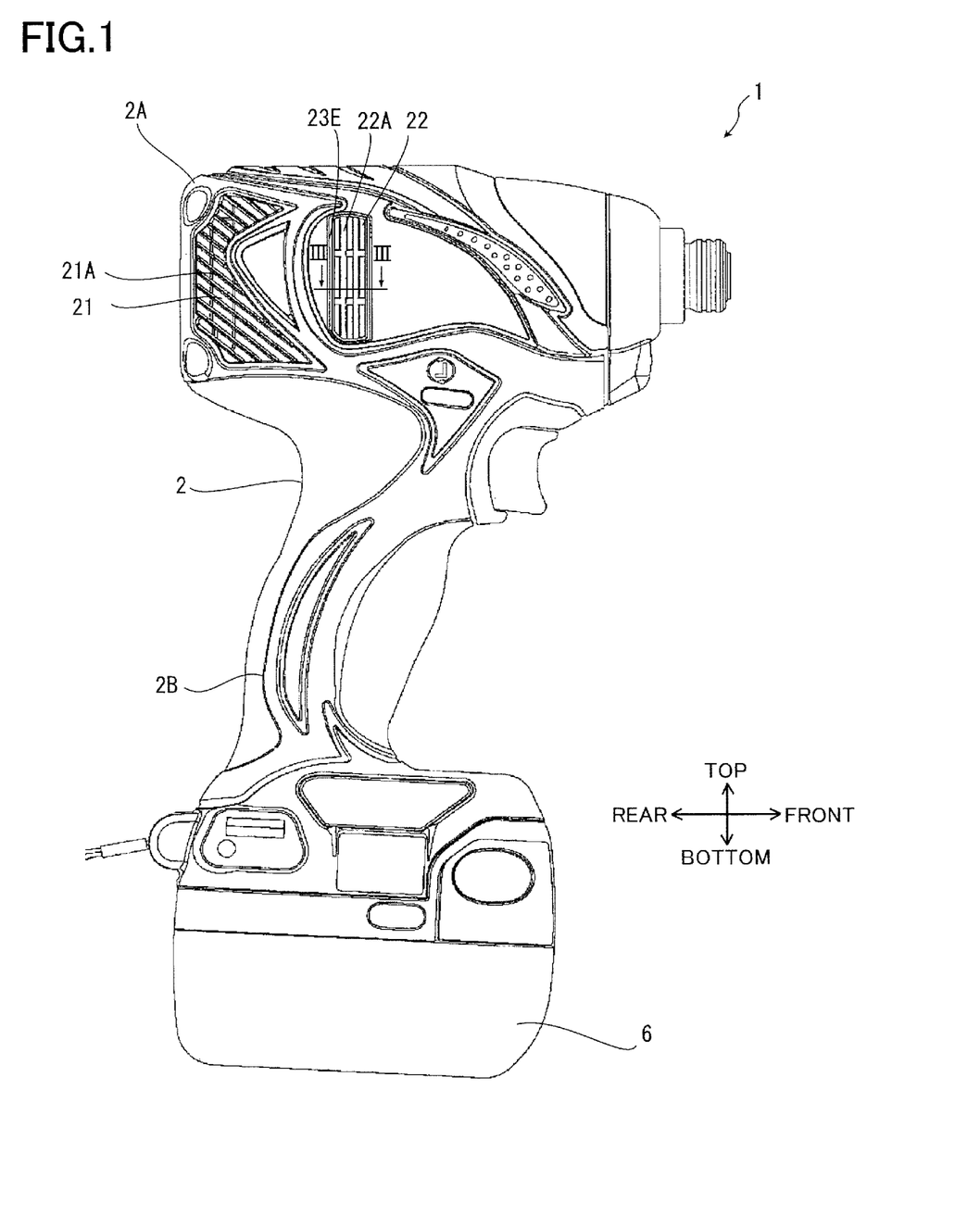
FIG. 1 is a side view of an impact driver according to an embodiment of the present invention.
Figure 2:
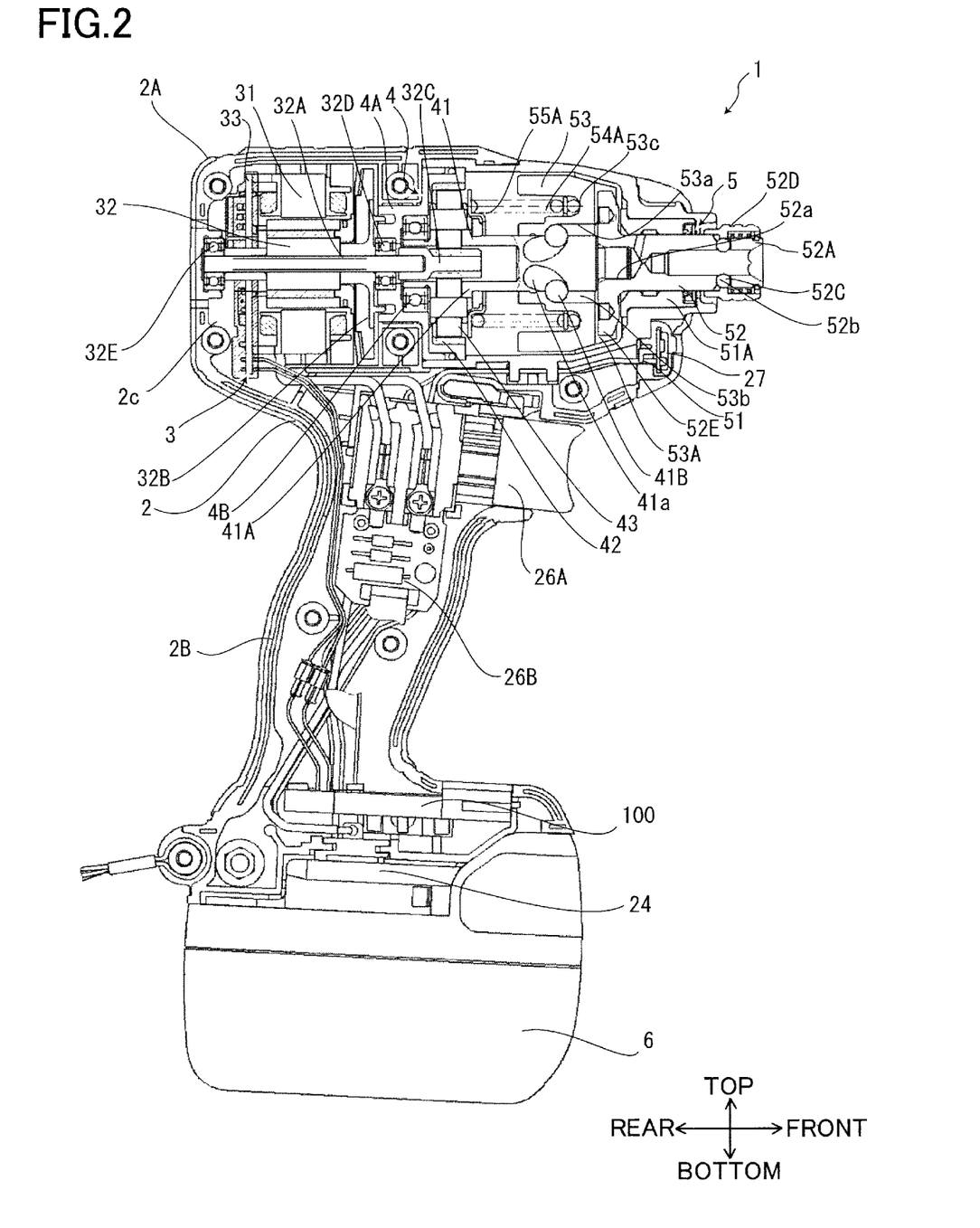
FIG. 2 is a vertical cross-sectional view of the impact driver according to the embodiment of the present invention, the impact driver including a housing on which a discharge port is formed.

An impact driver 1 as a power tool according to one embodiment of the present invention will be described with reference to FIGS. 1 through 5. FIG. 1 shows the impact driver 1 adapted to fasten a bolt, nut and a male thread, by using an end bit such as a bit and a socket. As shown in FIG. 2, the power toll 1 mainly includes a housing 2, a motor 3, a gear mechanism 4, and an impact mechanism 5. A rechargeable battery 6 is used as a power source for driving the impact driver 1.

The housing 2 is made from a resin such as 6-nylon. The resin housing 2 includes a body portion 2A in which the motor 3 is accommodated, and a handle 2B extending from the body portion 2A. The housing 2 is provided by two housing sections divided into two symmetrical sections complementary with each other. The two symmetrical sections are mated with each other in a mating plane extending in a vertical direction and a frontward/rearward direction (defined later) to provide an accommodation space within the body portion 2A and the handle portion 2B. The above-described motor 3, the gear mechanism 4 and the impact mechanism 5 are arrayed in line coaxially in the accommodation space of the body portion 2A from one end to another end portion of the body portion 2A. The frontward/rearward direction is coincident with the direction of this array in which the side of the motor 3 will be referred to as a rear side. Further, a direction from the body portion 2A to the handle portion 2B will be referred to as the vertical direction perpendicular to the frontward/rearward direction. The side of the handle 2B will be referred to as a lower side.

The body portion 2A is formed in a generally cylindrical shape in conformance with an outer profile of the motor 3. As shown in FIG. 1, in the body portion 2A, an intake port 21 and a discharge port 22 as ventilation holes are formed at each lateral side of the body portion 2A and at positions frontward and rearward of the motor 3. Specifically, the intake port 21 is formed at a position rearward of the motor 3 (see FIG. 2) and is covered with an intake-side grid 21A in order to prevent foreign objects from entering into the accommodation space of the body portion 2A. The intake-side grid 21A is integrally formed with the housing 2. The intake-side grid 21A has a plurality of elongate members arranged parallel to one another at equi-intervals, each elongate member extending in a direction intersecting with the vertical direction.

Figure 3:
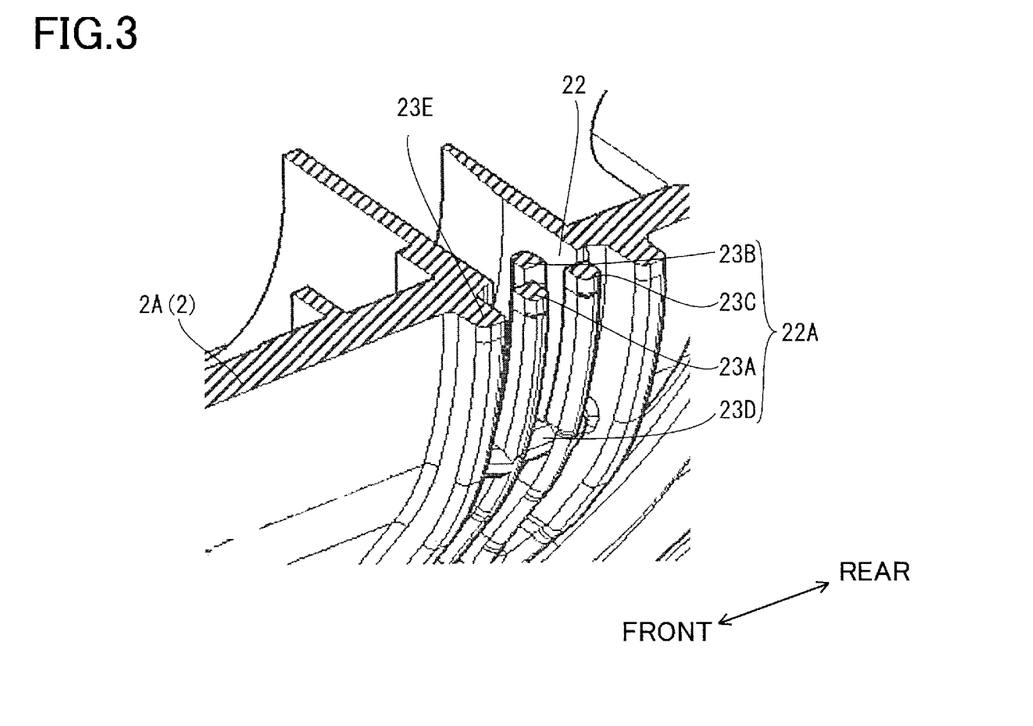
FIG. 3 is a partial perspective view of a cross-section of the housing of the impact driver of FIG. 1 taken along a line III-III shown in FIG. 1.
Figure 4:
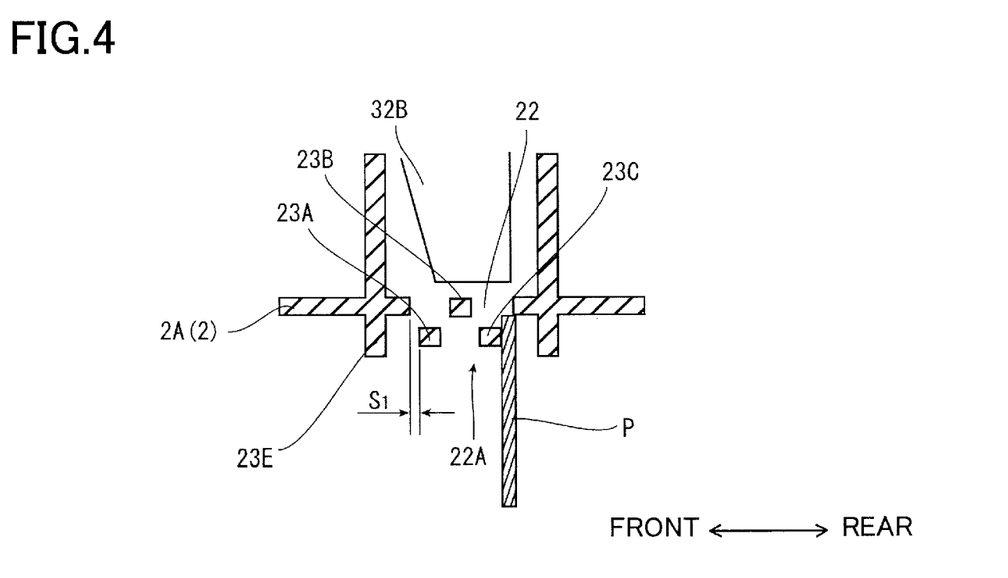
FIG. 4 is a schematic cross-sectional view of the impact driver of FIG. 1 taken along the line III-III shown in FIG. 1.

The discharge port 22 is formed at a position adjacent to a fan 32B (described later; see FIG. 2) and aligned with an outermost peripheral portion of the fan 32B in the frontward/rearward direction. The discharge port 22 is covered with a discharge-side grid 22A to prevent entry of foreign matters into the accommodation space of the body portion 2A. The discharge-side grid 22A is integrally formed with the housing 2. Specifically, as shown in FIGS. 3 and 4, the discharge-side grid 22A includes three elongated portions 23A, 23B, 23C and connecting portions 23D. The elongated portions 23A, 23B and 23C extend in a direction in conformance with a circumferential direction of the body portion 2A and arranged in the frontward/rearward direction. The connecting portions 23D extend in the frontward/rearward direction to connect the three elongated portions 23A, 23B and 23C in the frontward/rearward direction.

As shown in FIG. 4, the elongated portion 23B is positioned center among the three elongated portions 23A, 23B and 23C in the frontward/rearward direction; the elongated portion 23A is positioned frontward of the elongated portion 23B, and the elongated portion 23C is positioned rearward of the elongated portion 23B. The elongated portion 23B, which is positioned center of the discharge-side grid 22A, is positioned most inward (closer to a rotational shaft of the fan 32B) in a radial direction of the fan 32B among the three elongated portions 23A, 23B, 23C. The elongated portion 23B has an inner surface aligned with an inner surface of the body portion 2A, and an outer surface aligned with an outer surface of the body portion 2A.

The discharge port 22 has a shape defined by a circumferential surface whose length in the radial direction of the fan 32B is coincident with a thickness of the body portion 2A. In the radial direction of the fan 32B, the elongated portion 23A is positioned outward than a frontward portion of the circumferential surface defining the discharge port 22, and the elongated portion 23C is positioned outward than a rearward portion of the circumferential surface defining the discharge port 22. In other words, the elongated portions 23A and 23C are positioned outward (away from the rotational shaft of the fan 32B) than the outer surface of the body portion 2A in the radial direction of the fan 32B. In this way, the elongated portions 23A, 23B, 23C are arranged in a staggered manner to provide a lattice-like pattern together with the connecting portions 23D.

Referring to FIG. 4, gaps S1 in the frontward/rearward direction formed between the frontward portion of the circumferential surface of the discharge port 22 and the elongated portion 23A, between the elongated portions 23A and 23B, between the elongated portions 23B and 23C, and between the elongated portion 23C and the rearward portion of the circumferential surface of the discharge port 22 are defined to have such a length that a pin P having a diameter of 1.0 (based on IP4X of International Protection Code defined in JIS C 0920) cannot be entered into the accommodation space of the body portion 2A through any of the gaps S1.

As shown in FIG. 1, a frame portion 23E in a form of a rib is formed on the outer surface of the body portion 2A to protrude therefrom and to surround the discharge port 22. The discharge port 22 is enclosed by the frame portion 23E with a small distance therebetween. As shown in FIGS. 3 and 4, the frame portion 23E protrudes outward than the three elongated portions 23A, 23B and 23C in the radial direction of the fan 32B.

Referring to FIG. 2, in the housing 2, a terminal portion 24 is provided at a lower end portion of the handle 2B. The terminal portion 24 is adapted to accommodate therein the battery 6. Further, a control circuit portion 100 is provided above the terminal portion 24 for controlling rotation of the motor 3. The terminal portion 24 is electrically connected to the control circuit portion 100. The handle 2B has a base end portion provided with a trigger 26A for user's manipulation and a switching portion 26B connected to the trigger 26A and the control circuit portion 100 and adapted to control conduction to the motor 3. Further, a forward-reverse changeover lever (not shown) is provided at the base end portion of the handle 2B and above the trigger 26A for changing rotational direction of the motor 3. An LED light 27 is provided at a front end of the housing 2 and below the impact mechanism 5. The LED light 25 is connected to the control circuit portion 100 and is adapted to irradiate light frontward. Further, a cooling air passage 2c is formed within the housing 2. The cooling air passage 2c is positioned around the motor 3 and is spanned between the intake port 21 and the discharge port 22.

The motor 3 is DC brushless motor, and mainly includes a stator 31, a rotor 32 and a motor driver circuit 33. The stator 31 is hollow cylindrical shaped constituting an outer shell of the motor 3, and has an outer peripheral surface held to the hosing 2.

The rotor 32 is rotatably disposed in the stator 31. The rotor 32 has a rotor shaft 32A integral with a rotor body and extending in the frontward/rearward direction. An axis of the rotor shaft 32A defines a rotation axis of the rotor 32. The rotor shaft 32A has a front end portion provided with a centrifugal fan 32B and a pinion gear 32C, those being coaxially and integrally rotatable with the rotor shaft 32A. Further, a bearing 32D is provided at the front end portion and is rotatably supported to a frame body 4A described later. The rotor shaft 32A has a rear end portion rotatably supported to the body portion 2A through a bearing 32E.

Thus, the rotor shaft 32A is rotatably supported to the body portion 2A through the bearings 32D, 32E. Upon rotation of the rotor shaft 32A, the fan 32B is rotated integrally with the rotor shaft 32A to generate air flow in which air is introduced through the intake port 21 into the accommodation space of the body portion 2A and is discharged through the discharge port 22.

The motor driver circuit 33 as a circuit board is disposed at a rear side of the stator 31 and is fixed thereto. The motor driver circuit 33 includes a plurality of switching elements.

The gear mechanism 4 is positioned at a front side of the motor 3 in the body portion 2A. The gear mechanism 4 is a planetary gear mechanism whose sun gear is the pinion gear 32C, and whose outer shell is the frame body 4A supported to the housing 2. The planetary gear mechanism also includes a spindle 41, a ring gear 42, and a plurality of planetary gears 43. The spindle 41 functions as a carrier for supporting the plurality of planetary gears 43. The spindle 41 has a front end portion coaxially and rotatably supporting an anvil 52 (described later), and has a rear end portion rotatably supported to the frame body 4A through a bearing 4B.

A flange 41A is provided at a position adjacent to the rear end portion of the spindle 41 for rotatably supporting the planetary gears 43. Further, a first spring 54A (described later) is seated on the flange 41A. A hammer 53 (described later) is axially movably disposed over the spindle 41 to be movable in the frontward/rearward direction. The spindle 41 is formed with a pair of grooves 41a, 41a extending diagonally relative to the axial direction. A ball 41B is inserted in each groove 41a so that the spindle 41 and the hammer 53 are connected with each other through the balls 41B.

The ring gear 42 is fixed to the frame body 4A such that the ring gear 41 is positioned at radially outer side and concentrically with the spindle 41. Each planetary gear 43 is rotatably supported to the spindle 41 and is in meshing engagement with the ring gear 42 and the pinion gear 32C. With this structure, rotation of the pinion gear 32C is deceleratingly transmitted to the spindle 41.

The impact mechanism 5 includes a hammer case 51, the anvil 52, the hammer 53, and the first spring 54A.

The hammer case 51 is hollow cylindridal shaped and has a front end portion diametrically reduced. The hammer case 51 has a rear end portion connected to the body portion 2A and concentric with the motor 3, and has a front end portion provided with a bearing 51A for rotatably supporting the anvil 52.

The anvil 52 is cylindrical shaped extending in the frontward/rearward direction, and is rotatably supported to the hammer case 51 through the bearing 51A. The anvil 52 has a rear end portion formed with a bore 52a with which the front end portion of the spindle 41 is loosely fitted, so that the anvil 52 is rotatably supported to the spindle 41. The anvil 52 has a front end portion formed with an attachment hole 52b and provided with an end bit attachment portion 52A for attaching a socket (not shown).

The end bit attachment portion 52A includes a plurality of balls 52C protrudable into the attachment hole 52b, and an operation portion 52D biased rearward by a spring and abuttable on the balls 52C to push the balls 52C in a direction for permitting the balls 52C to protrude into the attachment hole 52b in the rearwardly biased state. The rear portion of the anvil 52 is integrally provided with a pair of blade portions 52E extending radially outwardly and diametrically opposite sides to each other.

The hammer 53 is cylindrical shaped and is formed with a through-hole 53a through which the spindle 41 extends. The hammer 53 has a front end portion provided with a pair of pawl portions 53A engageable with the blade portions 52E. Each pawl portion 53A protrudes frontward from a front end of the hammer 53, and is angularly spaced away from each other by 180 degrees. The pair of pawl portions 53A are shaped into a rotational symmetry, and each pawl portion 53A has a side surface extending in a direction perpendicular to a circumferential direction of the pawl portion 53A, and the side surface is inclined to make the pawl portion 53A to be taper shaped.

With this structure, when load from the hammer 53 is imparted on the anvil 52, the anvil 52 is urged to be moved frontward relative to the hammer 53 along the side surface, so that the blade portions 52E, 52E ride over or move past the pawl portions 53A, 53A, thereby permitting the hammer 53 to rotate with respect to the anvil 52. In an actual operation, because the anvil 52 is immovable frontward relative to the housing 2, the hammer 53 is moved rearward relative to the anvil 52, so that the blade portions 52E, 52E move past the pawl portions 53A, 53A, thereby permitting the hammer 53 to rotate with respect to the anvil 52.

The through-hole 53a of the hammer 53 has an inner peripheral surface formed with a pair of grooves 53b, 53b extending in the frontward/rearward direction into which the pair of balls 41B are inserted. Since the pair of balls 41B, 41B are inserted into the pair of grooves 53b, 53b of the hammer 53 and into the pair of grooves 41a, 41a of the spindle 41, the hammer 53 and the spindle 41 can be coaxially rotated together. The hammer 53 has a rear end portion provided with a spring retaining portion 53c to which one end portion of the first spring 54A is seated. The spring retaining portion 53c is positioned around a sleeve-like wall that defines the through-hole 53a.

A rear end of the first spring 54A is seated on the flange 41A of the spindle 41 through a washer. A front portion of the spindle 41 frontward of the flange 41A extends through an internal space of the first spring 54A. The front end portion of the first spring 54A is inserted into the spring retaining portion 53c so as to urge the hammer 53 frontward in the axial direction relative to the spindle 41. Thus, an urging force of the first spring 54A is in conformance with the axial direction and frontward direction. The pawl portions 53A of the hammer 53 can be engaged with the blade portions 52E of the anvil 52 because of the biasing force of the spring 54A applied to the hammer 53 in the forward direction.

Even if the hammer 53 is moved rearward relative to the anvil 52 during application of the load, the hammer 53 can be moved forward toward the anvil 52 by the biasing force of the first spring 54A at the timing when the blade portion 52E has moved past the pawl portion 53A, so that abutment between the pawl portion 53A and the blade portion 52E can be provided. In this way, impacting force in the rotational direction can be applied to the anvil 52 by the rotation of the hammer 53 relative to the anvil 52 and by the abutment of the blade portion 53A onto the blade portion 52E.

In the impact driver 1 having the above-described construction, the gaps S1 formed between the discharge port 22 and the discharge-side grid 22A in the frontward/rearward direction are designed such that the pin P having a diameter of 1.0 is not allowed to enter into the accommodation space of the body portion 2A through the gaps as described earlier. Nonetheless, since the three elongated portions 23A, 23B and 23C are arranged in a zigzag manner, especially between the frontward portion of the circumferential surface of the discharge port 22 and the elongate member 23A, and between the elongate member 23C and the rearward portion of the circumferential surface of the discharge port 22, formed are gaps S2 through which the pin P having 1.0 diameter can be entered into the accommodation space of the body portion 2A if the pin P is inserted along a direction diagonal to the frontward/rearward direction (see an arrow shown in FIG. 5). Therefore, in the present embodiment, the frame portion 23E is disposed to surround the discharge port 22 to prevent the pin P from entering into the accommodation space of the body portion 2A. Entry of the pin P through the gaps S2 can be prevented by the frame portion 23E, since the pin P seeking entry into the gap S2 inevitably abuts on the frame portion 23E.

Figure 5:
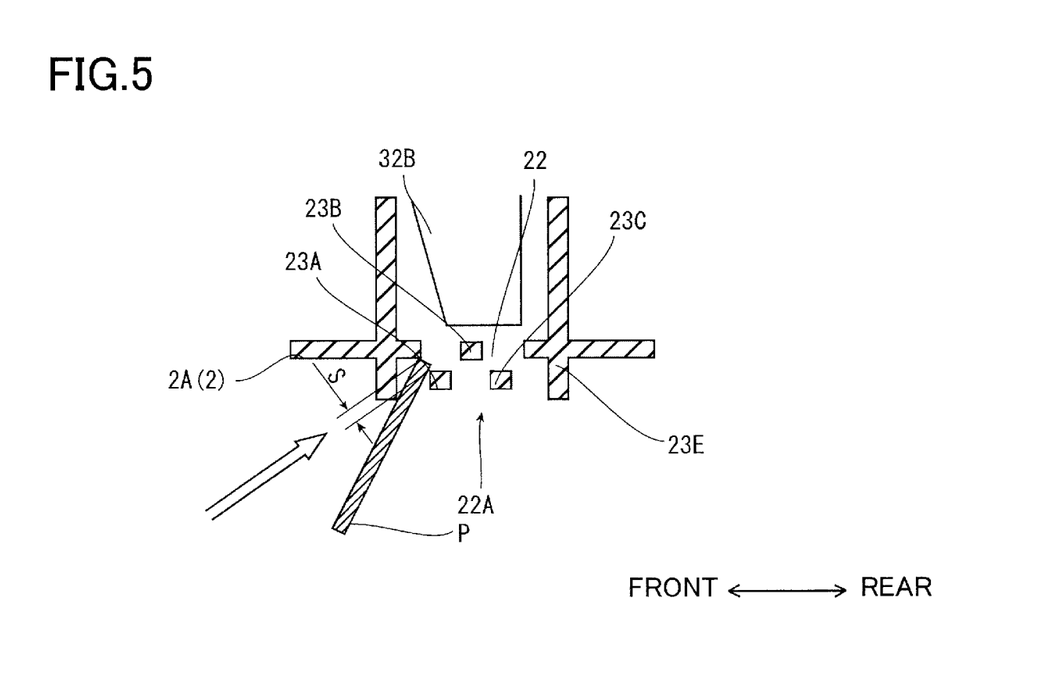
FIG. 5 is a schematic cross-sectional view illustrating relationship between the discharge port of the impact driver according to the embodiment and a pin.

Further, in the embodiment, since the frame portion 23E is formed to enclose the discharge port 22 therein, the frame portion 23E serves like a bank that suppresses infiltration of water droplets adhered to the outer surface of the body portion 2A into the discharge port 22.

Further, the discharge-side grid 22A is disposed such that the elongated portion 23B is aligned with the inner surface of the body portion 2A and the elongated portions 23A, 23C are positioned outward of the inner surface of the body portion 2A in the radial direction of the fan 32B. Therefore, the discharge-side grid 22A does not make contact with the fan 32B disposed within the body portion 2A. As a result, the body portion 2A can be designed to have a profile in conformance with an outer contour of the fan 32B, thereby realizing downsizing of the body portion 2A.

Various modifications are conceivable.

Figure 6:
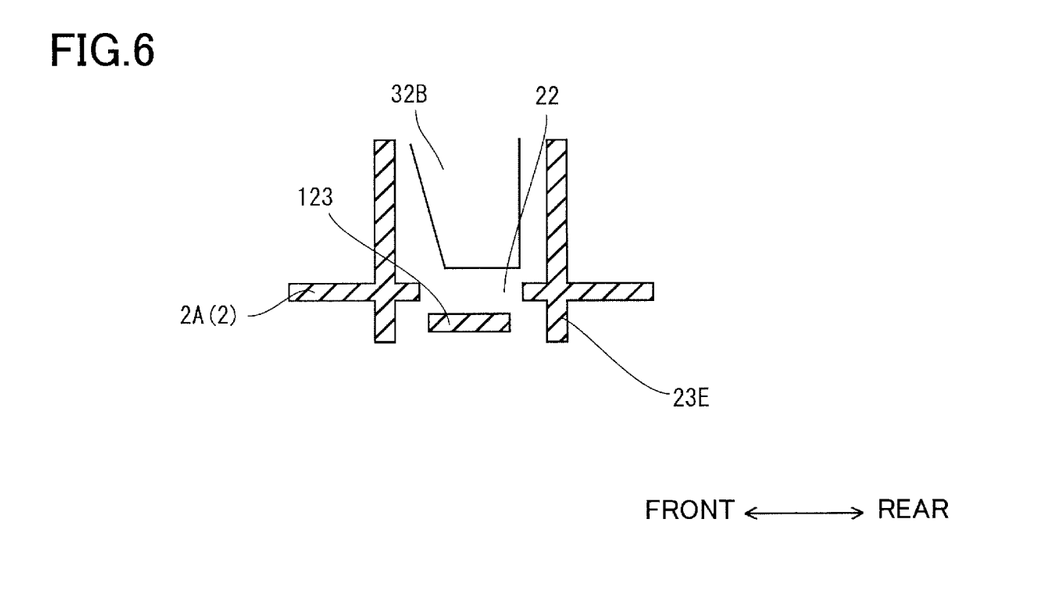
FIG. 6 is a schematic cross-sectional view illustrating relationship between the discharge port of the impact driver according to a first modification and a pin.

FIG. 6 shows a construction around the discharge port 22 according to a first modification of the present embodiment. In the first modification, a plate member 123 is provided to cover the discharge port 22. More specifically, the plate member 123 has a generally rectangular plate-like shape whose major side is coincident with the circumferential direction of the body portion 2A and whose minor side is coincident with the frontward/rearward direction. The plate member 123 is disposed outward than the outer surface of the body portion 2A (away from the rotational shaft of the fan 32B) in the radial direction of the fan 32B. In the frontward/rearward direction, gaps between the frontward portion of the circumferential surface of the discharge port 22 and a front end portion of the plate member 123, and between a rear end portion of the plate member 123 and the rearward portion of the circumferential surface of the discharge port 22 are respectively defined such that the pin P having a diameter of 1.0 does not penetrate into these gaps.

In the first modification as well, the frame portion 23E is provided around the discharge port 22 such that the frame portion 23E protrudes outward than the plate member 123 in the radial direction of the fan 32B. This construction can also prevent the pin P with 1.0 diameter from entering diagonally into the gaps between the frontward portion of the circumferential surface of the discharge port 22 and the front end portion of the elongate member 123, and between the rear end portion of the elongate member 123 and the rearward portion of the circumferential surface of the discharge port 22.

Figure 7:
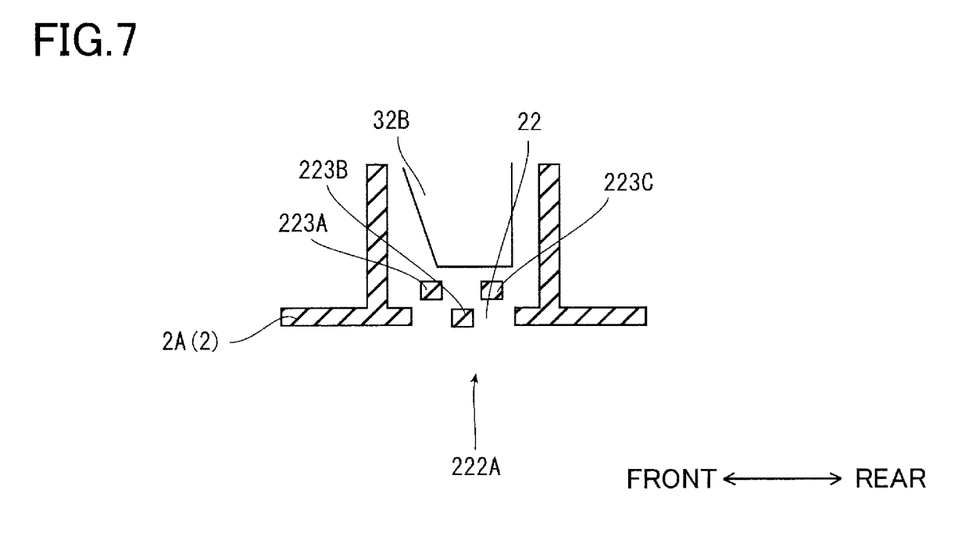
FIG. 7 is a schematic cross-sectional view illustrating relationship between the discharge port of the impact driver according to a second modification and a pin.

FIG. 7 shows a construction around the discharge port 22 according to a second modification of the present embodiment. In the second modification, a discharge-side grid 222A configured of a plurality of elongated portions 223A, 223B, 223C is provided to cover the discharge port 22. The discharge-side grid 222A has a structure generally identical to that of the discharge-side grid 22A of the depicted embodiment. However, although inner and outer surfaces of the elongated portion 223B (positioned center among the elongated portions 223A, 223B, 223C) are respectively aligned with those of the body portion 2A as in the depicted embodiment, the elongated portions 223A, 223C are disposed inward than the inner surface of the body portion 2A in the radial direction of the fan 32B. The frame portion 23E is not provided around the discharge port 22. With this construction, at least penetration of foreign objects can be suppressed, while realizing good discharge of air without an increase in resistance of air passage at the discharge port 22.

While the invention has been described in detail with reference to the above embodiment and modifications thereof, it would be apparent to those skilled in the art that various changes and variations may be made therein without departing from the scope of the claims.

For example, the present invention has been applied to ventilation holes as a discharge port in the embodiment and the two modifications, but the above-described constructions according to the present embodiment may also be applicable to ventilation holes as an intake port.

Further, in the depicted embodiment, the inner and outer surfaces of the elongated portion 23B are respectively arranged to be aligned with the inner and outer surfaces of the body portion 2A. However, the elongated portion 23B may not necessarily be aligned with the body portion 2A, but may be arranged so as to be offset from the body portion 2A.

INDUSTRIAL APPLICABILITY

The power tool according to the present invention can be applied not only to the impact driver as described above, but also to other variety of power tools having a motor, a fan, and a housing formed with an intake port and a discharge port.

The invention claimed is:

1. A power tool comprising:
a motor configured to drive an end bit;
a fan configured to be driven by the motor, the fan being rotatable about an axis extending in an axial direction, the fan defining a radial direction; and
a housing accommodating the motor and the fan therein, the housing comprising:
an outer wall defining an outer contour of the housing, the outer wall being formed with a ventilation hole through which part of the fan is exposed, the ventilation hole having a hole surface extending through a thickness of the outer wall, the hole surface having an inner point and an outer point opposite each other in the radial direction, the inner point being closer to the fan than the outer point is to the fan in the radial direction;
a grid provided at the outer wall and covering part of the ventilation hole, the grid defining a grid point closest to the outer point of the hole surface in the axial direction, the grid point being separated away from the axis of the fan by a distance different from a distance by which the inner point of the hole surface is separated away from the axis of the fan in the radial direction, the grid point and the outer point of the hole surface facing each other in an opposing direction, the grid point and the outer point of the hole surface defining a shortest gap distance therebetween in the opposing direction that is greater than a gap distance defined therebetween in the axial direction; and
a protruding portion protruding outward from the outer wall and arranged near the ventilation hole, the protruding portion having a portion positioned in a region defined between a first datum line and a second datum line, the first datum line passing through the outer point of the hole surface and extending in a direction orthogonal to the opposing direction, the second datum line being parallel to the first datum line and passing through the grid point of the grid.

2. The power tool according to claim 1, wherein the protruding portion has a protruding end in the radial direction, the protruding end having a point positioned closest to the outer point of the hole surface in the axial direction, a third datum line connecting the point of the protruding end and the outer point of the hole surface, a fourth datum line being parallel to the third datum line and passing through the grid point, a distance defined between the third datum line and the fourth datum line being smaller than the shortest gap distance defined between the grid point and the outer point of the hole surface in the opposing direction.

3. The power tool according to claim 1, wherein the protruding portion has a protruding end in the radial direction, the protruding end of the protruding portion being positioned farther away from the outer wall than the grid is from the outer wall in the radial direction.

4. The power tool according to claim 1, wherein the grid comprises a plurality of elongated portions arranged in a staggered manner.

5. The power tool according to claim 4, wherein the outer wall has an inner surface facing the fan in the radial direction of the fan, and
wherein one of the plurality of elongated portions positioned closest to the fan has an inner surface facing the fan in the radial direction, the inner surface of the outer wall and the inner surface of the closest one of the plurality of elongated portions being arranged in line with each other in the axial direction.

6. The power tool according to claim 4, wherein the plurality of elongated portions comprises:
a first elongated portion; and
a second elongated portion extending parallel to the first elongated portion and positioned farther away from the fan than the first elongated portion is from the fan in the radial direction, the first elongated portion and the second elongated portion defining a gap distance therebetween in the axial direction that is identical to the gap distance defined between the grid point and the outer point of the hole surface in the axial direction, and
wherein the first elongated portion and the second elongated portion face each other in a particular direction crossing the axial direction and the radial direction, a minimum gap distance between the first elongated portion and the second elongated portion in the particular direction being identical to the shortest gap distance between the grid point and the outer point of the hole surface in the opposing direction.

* * * * *